United States Patent [19]

Palicka et al.

[11] Patent Number: 4,824,624
[45] Date of Patent: Apr. 25, 1989

[54] METHOD OF MANUFACTURING BORON CARBIDE ARMOR TILES

[75] Inventors: Richard J. Palicka, San Clemente; John A. Negrych, Westminster, both of Calif.

[73] Assignee: Ceradyne, Inc., Costa Mesa, Calif.

[21] Appl. No.: 684,930

[22] Filed: Dec. 17, 1984

[51] Int. Cl.⁴ .............................................. B28B 11/00
[52] U.S. Cl. ........................................ 264/67; 264/56; 264/60; 109/49.5; 109/80; 89/36.02; 428/911
[58] Field of Search ................... 89/36.02; 264/67, 56, 264/60; 109/49.5, 80; 428/911

[56] References Cited

U.S. PATENT DOCUMENTS

| | | | |
|---|---|---|---|
| 3,702,593 | 11/1972 | Fine | 89/36.02 |
| 3,729,372 | 4/1973 | Matchen et al. | 89/36.02 |
| 3,730,826 | 5/1973 | Matchen et al. | 89/36.02 |
| 3,730,827 | 5/1973 | Matchen et al. | 89/36.02 |
| 4,005,235 | 1/1977 | Prochazka | 75/238 |
| 4,104,062 | 8/1978 | Weaver | 419/17 |
| 4,167,889 | 9/1979 | Böhne et al. | 89/36.02 |

*Primary Examiner*—Stephen J. Lechert, Jr.
*Attorney, Agent, or Firm*—Leonard Tachner

[57] ABSTRACT

A method of providing fastener holes in extremely hard ceramic armor comprises the steps of:
(a) providing a billet of precompacted ceramic powder material;
(b) drilling the desired holes in the billet;
(c) preparing a plug of non-sintering material that is chemically compatible with and has compaction characteristics similar to the ceramic powder material;
(d) pressing the plugs into the billet holes;
(e) hot pressing the billet and plugs at conventional temperature and pressure for manufacture of a ceramic armor structure, and;
(f) removing plugs by conventional tooling or sandblasting.

15 Claims, 2 Drawing Sheets

METHOD OF MANUFACTURING BORON CARBIDE ARMOR TILES

BACKGROUND OF THE INVENTION

1. FIELD OF THE INVENTION

The present invention relates generally to high technology ceramic materials and more specifically, to the manufacture of ceramic tiles of boron carbide having particularly advantageous application as ceramic armor.

2. PRIOR ART

Boron carbide is the lightest and hardest ceramic known to man. It has a mass of 2.5 grams per cubic centimeter and a hardness of 3,000 $Knoop_{100}$ Kilograms per square millimeter. As a result of these advantageous characteristics, namely, its low weight and extreme hardness, boron carbide has become well-known for its advantageous application as an armor material. Such material is normally provided in the form of rectangularly shaped tiles for protection of aircraft seats, hydraulics, cables, electronics, fuel lines and in other shapes for rotor hub assemblies in helicopters and so on. Typically, the ceramic material is structured with a layer of Kevlar on one side and a nylon spall shield on the other to provide a combination with the maximum stopping power for various threats comprising various calibers in the form of shells, bullets and the like.

Typically, such boron carbide tiles have dimensions of 8-12 inches along one dimension and 8-18 inches along the other. They are typically in the range of ¼ inch to ½ inch in thickness and are generally rectangular in shape with precision straight edges to render each tile geometrically compatible with adjacent tiles which in combination comprise the armor shield for a variety of applications including, for example, seat and airframe armor in the most advanced attack helicopters.

Typically, ceramics such as boron carbide are manufactured using a hot pressing process in which the ceramic is initially in a powder form and is compacted into a billet substantially identical to the ultimate ceramic shape desired. The precompacted billet is then loaded in a die and hot pressed. Hot pressing is a process in which high pressure is applied to the billet at extremely high temperatures. By way of example, it is not unusual in hot pressing manufacturing process of boron carbide ceramic tiles to utilize temperatures above 2,000 degrees Centigrade and pressures above 5,000 psi. The hot pressing process causes the boron carbide to become sintered and ultimately, upon cooling, the finished ceramic tile is an extremely hard ceramic material and therefore an ideal material for armor protection purposes.

Unfortunately, the incredible hardness of boron carbide ceramic also renders it disadvantageous from a manufacturing point of view. More specifically, in order to provide access to a structure, for example, a helicopter seat, it is often necessary that holes be provided in the tile to provide means for securing accessories by way of a plurality of bolts. However drilling holes in a material as hard as boron carbide ceramic is no easy task. Conventional machine drilling tools are no match for the harder ceramic material. Specially designed diamond drills are too expensive and the process of drilling too time consuming to provide a feasible and cost-saving process for drilling holes in boron carbide ceramics. As a result, one method of overcoming this manufacturing difficulty in the production of boron carbide ceramic armor tiles has been to replace the drilling process with a cutting process. This prior art method of overcoming the difficulties of drilling through boron carbide ceramic will be described hereinafter in more detail in conjunction with the detailed description of the invention. However, as it will be hereinafter more fully understood, the cutting process also has significant disadvantages which detract from this alternate manufacturing technique and make it highly desirable to find an alternative. For example, the substitute cutting process for providing holes in ceramic armor tiles is also a costly process because it involves significant additional man-hours but more importantly, it detracts significantly from the effectiveness of the tile material in terms of its threat-stopping capabilities. These relative disadvantages of the prior art process will be discussed hereinafter in more detail.

SUMMARY OF THE INVENTION

The present invention comprises an improved method of manufacturing boron carbide armor tiles which obviates the prior art requirement for either diamond tool drilling the completed ceramic armor or using the aforementioned substitute process of cutting which will be described hereinafter. The present invention utilizes a technique that has become known as the "Green Plug Insert" process in which the precompacted boron carbide billet is predrilled prior to the sintering hot press process thereby providing the required access holes in the precompacted billet before the ceramic carbide material is hardened into the ultimate ceramic tile. At first glance this may appear to be a rather obvious technique: i.e., merely drill the ceramic material, that is the boron carbide, while it is still in its powdered configuration and before it has taken on the ceramic hardness induced by the hot pressing process. Unfortunately, it is not as simple as one might at first believe. More specifically, if one were to simply drill the bolt holes required in the precompacted billet and then submit the billet to the hot pressing process, the surrounding boron carbide would merely diffuse into the predrilled apertures during the hot pressing process and the resultant tile would no longer have the predrilled holes. Consequently, diamond drilling or some form of substitute cutting would still be required.

The present invention overcomes this inherent problem in predrilling the precompacted billet by providing a process for filling the precompacted billet holes with plugs which fill the holes during the hot pressing process and which are designed to prevent the diffusing previously noted. Furthermore, these plugs are manufactured from a material which is chemically compatible and has the compaction characteristics similar to that of brittle ceramics that are hot pressed. By way of example, one such plug comprises a combination of graphite flake, carbon black and an organic binder in the form of gum arabic, polyvinyl alcohol, urea formaldehyde resin, polyethylene glycol, sugar and other possible organic materials. This combination, in a selected composition, is prepressed in the shape of a plug precisely dimensioned to fill a predrilled hole in the precompacted boron carbide powder at the desired location for providing the required bolt apertures. Other alternate embodiments of such plugs are also provided. By way of example, in one alternative embodiment of the invention the plug is made of the same boron carbide material but the outer periphery of the plug is coated with a parting material made of the same combination previously described, namely, graphite flake, carbon black and an organic binder. The inner periphery of the hole in the precompacted billet may also be coated with the same material. Alternatively, the coating may be a form of boron nitride. In still another embodiment a graphite foil such as Grafoil, which is a paper-like material, may be cut and wrapped around the plug in combination with some form of contact adhesive which secures the Grafoil to the plug and also to the surrounding billet for hot pressing. The key to the invention is the utilization of a non-sintering plug that is compatible with the surrounding boron carbide billet, namely, having compaction characteristics similar to a hard brittle ceramic being hot pressed for the purpose of forming easily removable hole plugs. As a result of the prepressed plug in the precompacted billet, at the termination of the hot pressing process the ceramic tile can be easily machined or sandblasted to remove the plugs and provide the desired holes in the desired locations with the desired size without requiring the disadvantageous prior art diamond drilling or substitute cutting which will be hereinafter described.

OBJECTS OF THE INVENTION

It is therefore a principal object of the present invention to provide a novel method of manufacturing boron carbide armor tiles which permits the manufacture of tile structures having holes that need not be drilled by extremely hard diamond drills or produced in other disadvantageous ways such as cutting.

It is an additional object of the present invention to provide a novel method of manufacturing boron carbide armor which is both extremely effective in stopping a variety of possible shells but is also lightweight to minimize the otherwise detrimental weight contribution of the ceramic armor.

It is still an additional object of the present invention to provide a novel method of manufacturing ceramic armor tiles of extremely hard materials such as boron carbide while providing a convenient and low-cost means for manufacturing such tiles with holes for receiving bolts to secure the tiles to the protected structure.

It is still an additional object of the present invention to provide a novel method of manufacturing boron carbide armor tiles by using a green plug insert in the form of a pressed non-sintered plug which is inserted in a predrilled hole in a precompacted billet and hot pressed in combination and thereafter removed by conventional machine drilling or sandblasting.

BRIEF DESCRIPTION OF THE DRAWINGS

The aforementioned objects and advantages of the present invention, as well as additional objects and advantages thereof, will be more fully understood hereinafter as a result of a detailed description of various embodiments of the present invention when taken in conjunction with the following drawings in which.

DETAILED DESCRIPTION OF THE INVENTION

Figure 1:
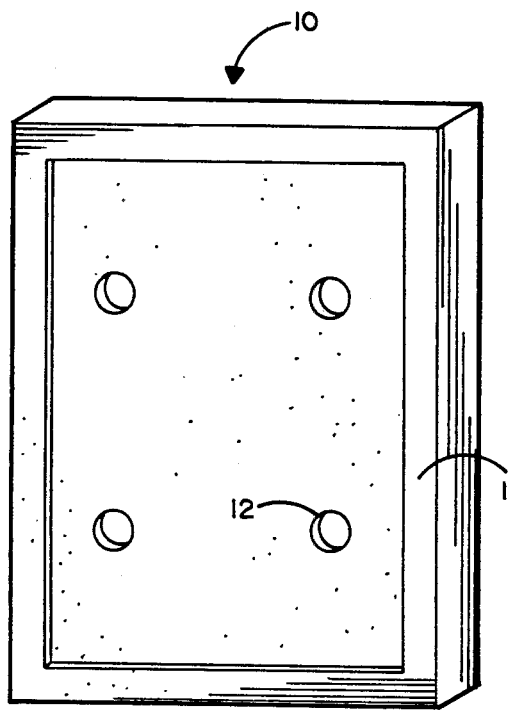
FIG. 1 is an isometric view of a typical boron carbide ceramic armor tile having a plurality of desired holes for receiving bolts to secure the tile to a structure upon which the tile is mounted.

Referring first to FIG. 1 it will be seen that a typical armor tile 10 made of boron carbide ceramic is rectangular in shape and may have one or more bolt holes 12 adapted to receive bolts for connecting the tile to the structure the tile is designed to protect. Typical dimensions for such tiles are in the range of 8-18 inches by 8-12 inches in lateral dimensions and in the range of approximately $\frac{1}{4}$ to $\frac{1}{2}$ inch in thickness. The actual dimensions, including the thickness of the tile, are dictated by the specification of the required stopping power of the armor in terms of what is required to prevent penetration by a particular threat at a given speed. In some instances a Kevlar backing is used to increase protection. It is also common to utilize a cover affixed to the outer face of the boron carbide tile. This covering is commonly referred to as a spall shield and is in the form of a lightweight, high strength nylon. The spall shield prevents loose fragments of ceramic from injuring personnel or equipment upon threat impact. A greater cross section of ceramic is usually required at a joint as compared to the cross section in the heart of the tile. Consequently, the ceramic armor tile of FIG. 1 is shown with raised edges 14. Typically, the joints are raised approximately 0.09 inches over a width of $\frac{3}{4}$ inch from the edge of the tile. This assures that a target impacting the armor at a joint between two tiles will not penetrate any further than if it had impacted at a location closer to the center of the tile.

The tile of FIG. 1 is shown with four fastener holes 12 approximately $\frac{3}{4}$ inch in diameter. Such bolt holes may vary in diameter between $\frac{1}{8}$ inch and 3 inches depending upon the size of the tile. Obviously, the number of holes may also vary. The number of four holes shown in FIG. 1 and in other figures herein, is for purposes of explanation only.

Figure 2:
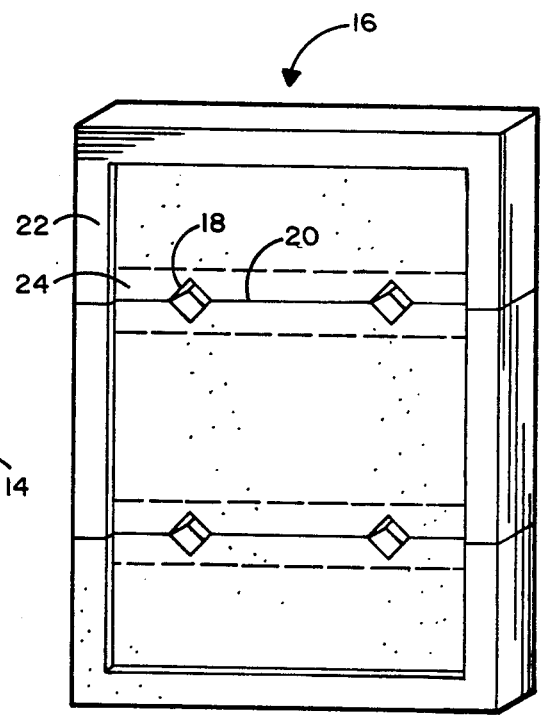
FIG. 2 is a three-dimensional drawing of a similar tile manufactured using the prior art process of cutting the tile to provide apertures for receiving the aforementioned bolts.

As previously indicated, boron carbide ceramic material is the hardest ceramic known to man, namely, 3,000 Knoop$_{100}$ Kilogram per square millimeter. This is about 93% of the hardness of diamond. Consequently, about the only way to drill holes directly into the surface of the ceramic tile 10 to provide the desired diameter bolt holes 12 is to use a diamond surface drill bit. As those familiar with the art of the present invention will appreciate, using a diamond surface drill bit still requires a substantial amount of time to drill through the thickness of the ceramic tile, thus requiring a substantial amount of manual labor or machine useage and in any case, prolonging the production time of the ceramic tiles. Furthermore, diamond surface drill bits are expensive and the use of such drill bits also adds considerable cost to the manufacture of the ceramic tiles. Accordingly, the industry has found an alternative prior art method of providing the tiles with apertures for receiving bolts. A typical configuration is illustrated in the prior art drawing of FIG. 2 which for purposes of illustration, shows a ceramic tile 16 similar in configuration to that of FIG. 1. As seen in FIG. 2, the ceramic tile 16 is provided with a plurality of rectangular or diamond shaped apertures 18 which are achieved by substituting the process of cutting for drilling. Those having skill in the art to which the present invention pertains will appreciate that cutting a hard surface using a saw is a much easier, more expedient process than drilling. However, in order to obtain access to the region of the tiles into which the apertures are to be cut, it is also common to cut the tile transversely along the cuts 20. Thus in the configuration of FIG. 2 it is seen that as a result of requiring access to the region of the tile into which apertures are to be cut, the tile itself has been cut into three sections.

The prior art aperture production method represented by the tile 16 of FIG. 2, presents significant disadvantageous trade-offs which reduce the otherwise advantageous process of cutting. More specifically, the apertures are not circular in cross-section and therefore tend to be larger than the diameter of the bolt which passes through each such aperture. As a result, the integrity of the tile is reduced in terms of its penetration stopping power, particularly for threats that impact in and around the bolt head. Also significantly, the requirement for cutting the tile transversely, increases the number of edges. Accordingly, unless the edges are raised in the same manner as edges 22 and edges 14 of FIG. 1, there is a reduction in the integrity of the ceramic penetration stopping power along the cuts in the tile. Accordingly, these additional edges 24 also must be raised in order to maintain the integrity of the tile at the junction of the cuts 20. In the particular prior art embodiment illustrated in FIG. 2 these edges have not been raised which would of course create the disadvantageous reduction in penetration stopping power for threats that impact the tile along the cuts 20. However, if the edges are raised, such raised edges add to the weight of the armor to a degree dependent upon the total linear dimension of such edges. In the particular example of FIG. 2, in order to maintain the integrity of the tile it would be necessary to provide four additional raised edges of the smaller lateral dimension of FIG. 2 thereby almost doubling the total raised surface area of the ceramic tile in order to maintain the integrity of the tile. Clearly, alternative methods for providing the desired bolt holes to avoid this need for additional raised edges and the disadvantageous shape and size of the apertures provided by cutting, would be highly advantageous.

Figure 3:
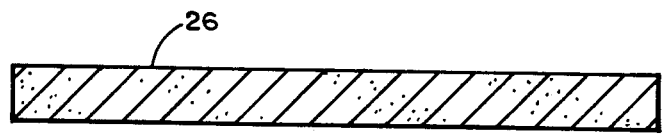
FIG. 3 is a cross-sectional top view of a precompacted billet provided in the first step of the present invention.
Figure 4:
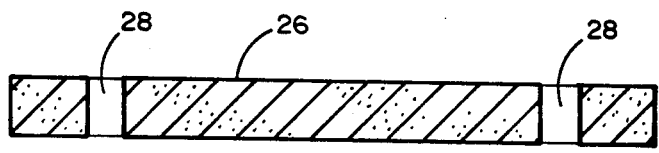
FIG. 4 is a cross-sectional top view of a drilled precompacted billet provided in accordance with the second step of the present invention.
Figure 5:
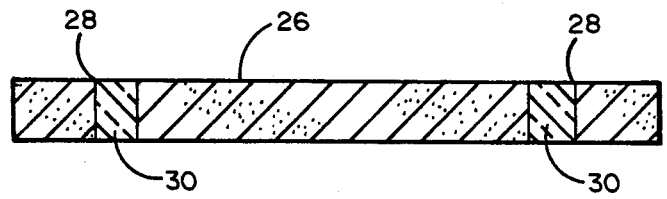
FIG. 5 is a cross-sectional top view of a plug filled precompacted billet provided in accordance with the third step of the present invention.
Figure 6:
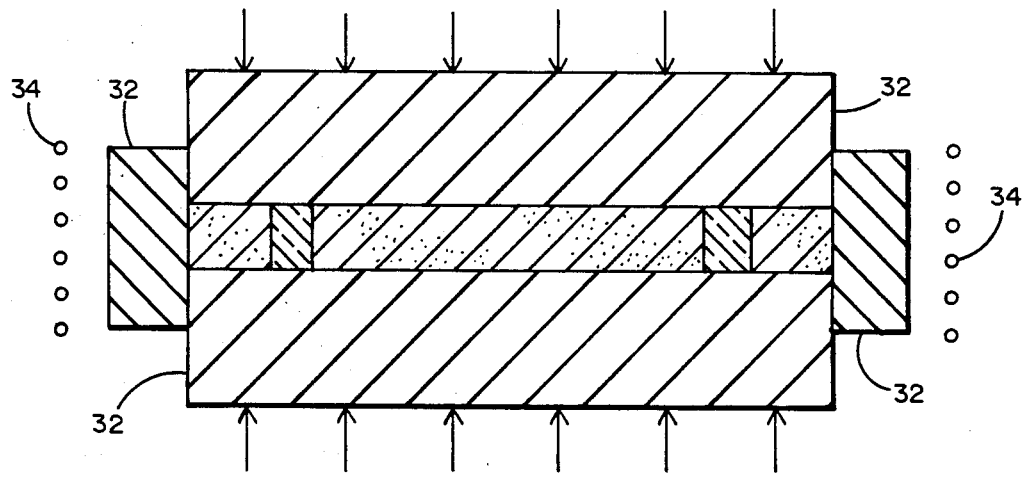
FIG. 6 is a cross-sectional top view of a plug filled precompacted billet contained within the hot press die of a hot press used to apply high pressure and temperature to the billet in accordance with the fourth step of the present invention.

Reference will now be made to FIGS. 3-8 for a detailed description of just such a method. More specifically, FIG. 3 illustrates the first step of the present invention, namely, providing a precompacted billet 26 of boron carbide powder in the requisite configuration for manufacture of a boron carbide ceramic armor tile using hot pressing techniques. It will be recognized that because the billet of FIG. 3 is made from a precompacted powder, it is relatively easy to drill a hole in the relatively soft billet with the hole configured substantially identical to the ultimate hole required to provide the desired bolt hole pattern of the finished ceramic product. The second step of the method of the present invention is illustrated in FIG. 4 wherein it is shown that the precompacted billet 26 of FIG. 3 has been drilled with a desired hole pattern creating holes 28 as seen in the cross-sectional top view of FIG. 4. The next step in the process of the present invention is illustrated in FIG. 5 wherein it is shown that the precompacted billet of FIGS. 3 and 4 has had holes 28 filled with a plug 30 the composition of which will now be described.

In a preferred embodiment of the present invention each plug 30 comprises graphite flake, carbon black and an organic binder. The organic binder may be selected from any of the following: gum arabic, polyvinyl alcohol, urea formaldehyde resin, polyethylene glycol or molasses. Typically, the organic binder makes up between 0.5% and 5% of the total composition with the remainder of the composition being made up of the graphite flake and carbon black. The graphite flake comprises between 50 and 70% of the remainder and the carbon black comprises between 30 and 50% of the remainder. The aforementioned combination of materials comprising the plug 30 are pressed into the holes 28 of the predrilled, precompacted billet 26 as shown in FIG. 5. Those having skill in the art to which the present invention pertains will now appreciate that the aforementioned combination of ingredients is not the only combination that would satisfy the requirements for plug 30 of FIG. 5. Generally speaking, any non-sintering material that is chemically compatible and has compaction characteristics similar to boron carbide for hot pressing for the purpose of forming easily removable plugs from holes, would be satisfactory for purposes of the present invention. Thus for example alternative embodiments for the plugs 30 of FIG. 5 may comprise a boron carbide plug that is coated along its outer periphery, that is, the border between the plug and the interior periphery of the hole 28 to prevent dispersion of the plug material into the remainder of the tile. The coating may be made of the same combination of materials described for the entire plug of the first embodiment, namely, a combination of graphite flake, carbon black and an organic binder. Alternatively, the coating may be made of boron nitride which has a graphite-like hexagonal plate structure and which will not diffuse into the boron carbide thereby rendering the hot pressed tile easily machined to remove the plugs as in the first embodiment described above.

Still an additional means for accomplishing the present invention includes the steps of coating a plug of boron carbide with a graphite foil such as commercially available Grafoil, a paper-like material which can be cut and wrapped around the plug and combined with a contact adhesive or a combination of boron nitride and a contact adhesive to prevent diffusion of the plug material into the remaining tile material. Still an additional embodiment of the present invention comprises the step of configuring a plug made of boron carbide in a 25 to 50% mixture of graphite. The significant graphite composition of the plug renders the hot pressed plug material far more conducive to removal as described hereinafter.

Figure 7:
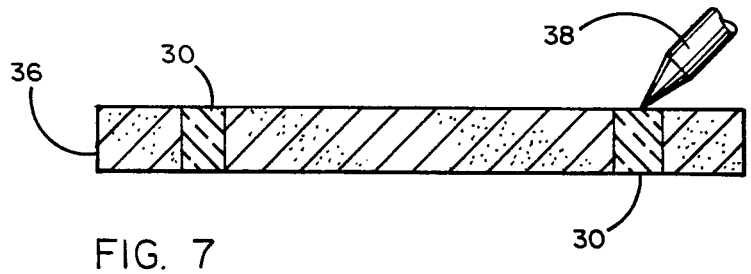
FIG. 7 is a cross-sectional top view of a hot pressed, hardened boron carbide ceramic armor tile having non-sintered plugs and shown being machined by a suitable device for removing the plug in accordance with the fifth step of the present invention.
Figure 8:
FIG. 8 is a cross-sectional top view of a completed boron carbide ceramic armor tile manufactured in accordance with the present invention.

Irrespective of the plug composition and the method of fabrication of the plug as hereinabove described, the next step in the process of the present invention is placing the plugged precompacted billet of boron carbide into a suitable hot press die 32 of conventional configuration. Typically, such hot press facilities are of the induction heating type having an induction coil 34 which can raise the temperature of the billet to greater than 2,000 degrees Centigrade while applying a uniform pressure of at least 5,000 psi. The hot pressing and cooling take about twenty hours. At the termination of the hot pressing step the previously precompacted billet has formed into a uniform ceramic tile having non-sintered plugs as shown in FIG. 7. Irrespective of the choice of the various embodiments of plug 30, the plugs, at this stage, are easily removed by a number of well-known methods including conventional machine tooling or sandblasting depending upon the size of the hole desired. In any case, because of the non-sintered plug of the present invention, there is no need to use diamond coated drilling bits and no need to employ the cutting technique illustrated in FIG. 2. As a result, it is relatively easy to remove plugs 30 in the completed ceramic tile 36 of FIG. 7. The final configuration of the tile as a result of the method of the present invention is illustrated in FIG. 8 wherein it is shown that the completed tile has the desired bolt holes 28 which can be of the desired shape and dimension to accommodate suitable bolts for securing the tile to the underlying structure without requiring additional raised edges and without in any other way, reducing the integrity of the ceramic armor tile.

The steps of the present invention may be summarized as follows:

Providing a billet of precompacted boron carbide in the shape of the desired end product ceramic tile;

Drilling the desired holes in the soft precompacted billet; and

Prepressing a plug into the precompacted billet holes, the plug being manufactured from a combination of graphite flake, carbon black and organic binder or alternatively, of boron carbide coated on its surface with the composition previously described or with boron nitride or with Grafoil and a contact adhesive or Grafoil and a combination of boron nitride and a contact adhesive. Still another alternative embodiment utilizes a plug comprising a mixture of boron carbide and graphite wherein the graphite comprises approximately 25-50% of the mixture;

The next step in the process is hot pressing the precompacted billet including plugs at conventional temperature and pressure normally used to provide the completed ceramic tile structure;

The next step in the process is mechanically removing the non-sintered plugs from the hot pressed ceramic material using conventional techniques such as machine drilling or sandblasting.

Those having skill in the art to which the present invention pertains will now understand as a result of the applicants' teaching herein that a significant improvement in the manufacture of boron carbide ceramic armor tiles has been disclosed. More specifically, as a result of the applicants' teaching herein it will now be seen that it is possible to provide holes of the desired location, configuration and dimension in a boron carbide ceramic armor tile suitable for receiving fasteners, but without requiring costly diamond surface drilling. The invention completely obviates the prior art requirement for cutting which results in undesirable hole shapes and either decreases the integrity of the armor or increases its weight as a result of edge raising required to maintain the penetration integrity. The novel method of the present invention employs non-sintering plugs that fill drilled holes in the precompacted billet of boron carbide. The plug is chemically compatible and has compaction characteristics similar to the boron carbide billet while at the same time being configured either by its composition or by its coating to prevent diffusion into the surrounding boron carbide during the hot pressing step. A number of alternative embodiments of the present invention specifically directed to the composition of the plug and the manner in which it is fabricated, have been disclosed. However, as a result of applicants' teaching herein, additional alternative embodiments suitable for use in the present invention will now be perceived by those having skill in the art to which the invention pertains. Therefore, it is to be understood that all such additional embodiments are contemplated as being within the scope of the present invention which is to be limited only by the claims appended hereto.

We claim:

1. A method of manufacturing ceramic armor tiles having holes for receiving bolts; the method comprising the steps of:
   (a) providing a billet of precompacted ceramic powder material;
   (b) drilling the desired holes in the billet;
   (c) preparing plugs comprising material that is chemically compatible with and has compaction characteristics similar to the ceramic powder material;
   (d) pressing the plugs into respective billet holes;
   (e) hot pressing the billet and plugs; and
   (f) removing the plugs.

2. The method recited in claim 1 wherein said ceramic is boron carbide.

3. The method recited in claim 1 wherein said plugs comprise graphite flake, carbon black and an organic binder.

4. The method recited in claim 1 wherein said plugs comprise the ceramic powder material and a coating of graphite flake, carbon black and an organic binder.

5. The method recited in claim 1 wherein said plugs comprise the ceramic powder material and a coating of boron nitride.

6. The method recited in claim 1 wherein said plugs comprise the ceramic powder material and a coating of graphite foil.

7. The method recited in claim 1 wherein said plugs comprise the ceramic powder material and graphite.

8. A method of manufacturing boron carbide ceramic armor tiles having at least one hole for receiving a bolt; the method comprising the steps of:
   (a) providing a billet of precompacted boron carbide powder;
   (b) removing a portion of said precompacted powder to form a hole therethrough;
   (c) preparing a non-sintering plug comprising material that is chemically compatible with and has compaction characteristics similar to boron carbide;
   (d) pressing the plug into said hole until said hole is entirely filled by said plug;
   (e) subjecting said billet to temperature and pressure sufficient to sinter said billet to form a brittle ceramic tile therefrom; and (f) removing said plug from said billet leaving a hole therethrough.

9. The method recited in claim 8 wherein said plugs comprise graphite flake, carbon black and an organic binder.

10. The method recited in claim 8 wherein said plugs comprise boron carbide powder and a coating of graphite flake, carbon black and an organic binder.

11. The method recited in claim 1 wherein said plugs comprise boron carbide powder and a coating of boron nitride.

12. The method recited in claim 8 wherein said plugs comprise boron carbide powder and a coating of graphite foil.

13. The method recited in claim 8 wherein said plugs comprise boron carbide powder and graphite.

14. The method recited in claim 4 wherein said organic binder is selected from the group consisting of:
(a) gum arabic;
(b) polyvinyl alcohol;
(c) urea formaldehyde;
(d) polyethylene glycol;
(e) molasses.

15. The method recited in claim 10 wherein said organic binder is selected from the group consisting of:
(a) gum arabic;
(b) polyvinyl alcohol;
(c) urea formaldehyde;
(d) polyethylene glycol;
(e) molasses.

* * * * *